US009178219B2

(12) United States Patent
Yang et al.

(10) Patent No.: US 9,178,219 B2
(45) Date of Patent: Nov. 3, 2015

(54) ELECTROCHEMICAL DEVICE INCLUDING AMORPHOUS METAL OXIDE

(71) Applicant: Ford Global Technologies LLC, Dearborn, MI (US)

(72) Inventors: Jun Yang, Bloomfield Hills, MI (US); Patrick Pietrasz, Southgate, MI (US); Chunchuan Xu, Bloomfield Hills, MI (US); Richard E. Soltis, Saline, MI (US); Mark S. Sulek, Sterling Heights, MI (US); Robert F. Novak, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 16 days.

(21) Appl. No.: 13/721,908

(22) Filed: Dec. 20, 2012

(65) Prior Publication Data

US 2014/0178801 A1     Jun. 26, 2014

(51) Int. Cl.
*H01M 4/02* (2006.01)
*H01M 4/88* (2006.01)
*H01M 8/10* (2006.01)

(52) U.S. Cl.
CPC .... *H01M 4/8803* (2013.01); *H01M 2008/1095* (2013.01); *Y02E 60/50* (2013.01)

(58) Field of Classification Search
CPC .................. H01M 4/8803; H01M 2008/1095; Y02E 60/50
USPC .................................. 429/482, 483, 523, 532
See application file for complete search history.

(56) References Cited

U.S. PATENT DOCUMENTS

| | | | |
|---|---|---|---|
| 6,063,142 A | 5/2000 | Kawakami et al. | |
| 6,326,098 B1 | 12/2001 | Itoh et al. | |
| 7,449,132 B2 | 11/2008 | Kakuta et al. | |
| 8,187,745 B2 * | 5/2012 | Tamura et al. | |
| 2004/0197641 A1 * | 10/2004 | Visco et al. | 429/137 |
| 2005/0079402 A1 | 4/2005 | Tanaka et al. | |
| 2007/0042252 A1 | 2/2007 | Kazarinov | |
| 2007/0213209 A1 | 9/2007 | Siddiqui et al. | |
| 2007/0248874 A1 * | 10/2007 | Aoyama | 429/41 |
| 2008/0312070 A1 | 12/2008 | Talbot et al. | |
| 2009/0081511 A1 | 3/2009 | Miyazaki et al. | |
| 2009/0162750 A1 | 6/2009 | Kawakami et al. | |

(Continued)

FOREIGN PATENT DOCUMENTS

| | | |
|---|---|---|
| CN | 102142538 | 8/2011 |
| WO | 2011/056290 | 5/2011 |

OTHER PUBLICATIONS

WO 2012133136A1.*

(Continued)

*Primary Examiner* — Stewart Fraser
(74) *Attorney, Agent, or Firm* — Damian Porcari; Brooks Kushman P.C.

(57) ABSTRACT

In one or more embodiments, an electrochemical device includes a substrate having a substrate surface; an amorphous metal oxide layer supported on the substrate surface; and a noble metal catalyst supported on the amorphous metal oxide layer to form a catalyst layer. The amorphous metal oxide layer may contact only 25 to 75 percent of the substrate surface. The amorphous metal oxide layer may include less than 10 weight percent of crystalline metal oxide. In certain instances, the amorphous metal oxide layer is substantially free of crystalline metal oxide.

20 Claims, 5 Drawing Sheets

(56) References Cited

U.S. PATENT DOCUMENTS

| | | |
|---|---|---|
| 2010/0021819 A1 | 1/2010 | Zhamu et al. |
| 2011/0033746 A1 | 2/2011 | Liu et al. |
| 2012/0077095 A1 | 3/2012 | Roumi et al. |
| 2012/0125154 A1 | 5/2012 | Manthiram et al. |
| 2012/0145037 A1 | 6/2012 | DeLuca et al. |
| 2012/0183869 A1 | 7/2012 | Jin et al. |
| 2012/0189943 A1 | 7/2012 | Campbell et al. |
| 2014/0054180 A1* | 2/2014 | Morimitsu .................. 205/560 |

OTHER PUBLICATIONS

Xiangbo Meng et al., Non-Aqueous Approach to Synthesize Amorphous/Crystalline Metal Oxide-Graphene Nanosheet Hybrid Composites.

Kou, Rong et al., Stabilization of Electrocatalytic Metal Nanoparticles at Metal-Metal Oxide-Graphene Triple Junction Points, dx.doi.org/10.1021/ja107719u, J. Am. Chem. Soc. 2011, 133, 2541-2547.

Baturina, Olga A. et al., Oxygen Reduction Reaction on Platinum/Tantalum Oxide Electrocatalysts for PEM Fuel Cells, Journal of the Electrochemical Society, 155 (12) B1314-B1321, 2008.

Dong, Lifeng et al., Graphene-Supported Platinum and Platinum-Ruthenium Nanoparticles for Fuel Cell Applications, Physics and Applications of Graphene—Experiments, Dr. Sergey Mikhallove (Ed.), ISBN: 978-953-307-217-3, InTech, Apr. 10, 2011, p. 525-541, 17 pages.

Gatewood, Daniel S. et al., Support Effects on Water Activation and Oxygen Reduction Over Au-SnOx Electrocatalysts Observed with X-Ray Absorption Spectroscopy, Journal of The Electrochemical Society, 155 (8) B834-B842 (2008).

Baker, Wendy S. et al., Enhanced Oxygen Reduction Activity in Acid by Tin-Oxide Supported Au Nanoparticle Catalysts, Journal of The Electrochemical Society, 153 (9) A1702-A1707 (2006).

Garsany, Yannick et al., High-Activity, Durable Oxygen Reduction Electrocatalyst: Nanoscale Composite of Platinum-Tantalum Oxyphosphate on Vulcan Carbon, DOI: 10.1021/jz100681g, J. Phys. Chem. Letters, 2010, 1, 1977-1981.

Korovina, Anna et al. Understanding Oxygen Reduction on Tantalum Oxyphosphate and Tantalum Oxide Supported Platinum by X-ray Absorption, Spectroscopy, dx.doi.org/10.1021l jp302023h , J. Phys. Chem. C 2012, 116, 18175-18183.

Sasaki K. et al. Ultra-low Platinum Content Fuel Cell Anode Electrocatalyst With a Long-Term Performance Stability, Electrochimica Acta 49 (2004) 3873-3877.

Zhang et al. J. Phys. Chem C. VI. 114, No. 39, 2010; 12 pages.

Zhang et al. Energy Environ, Sci., 2012, 5, 6156, 18 pages.

* cited by examiner

ELECTROCHEMICAL DEVICE INCLUDING AMORPHOUS METAL OXIDE

TECHNICAL FIELD

The present invention relates to an electrochemical device including an amorphous metal oxide and a method of making the same.

BACKGROUND

Fuel cells are potential low emission energy sources to power vehicles. Existing fuel cell catalysts include platinum (Pt) nano-particles on carbon support. These catalysts are susceptible to catalyst dissolution and/or agglomeration, often require excessive precious catalyst loading, and therefore are cost-inefficient in general.

SUMMARY

In one or more embodiments, an electrochemical device includes a substrate having a substrate surface; an amorphous metal oxide layer supported on the substrate surface; and a noble metal catalyst supported on the amorphous metal oxide layer to form a catalyst layer. The amorphous metal oxide layer may contact only 25 to 75 percent of the substrate surface. The amorphous metal oxide layer may include less than 10 weight percent of crystalline metal oxide. In certain instances, the amorphous metal oxide layer is substantially free of crystalline metal oxide.

The electrochemical device may further include a proton exchange membrane adjacent to the catalyst layer.

The amorphous metal oxide may be of a general formula of $MO_x$. $MO_x$ may be oxygen deficient, of which x may be a value of between 0.9 to 2.2. The amorphous metal oxide layer may include a number of discontinuities and may be of a thickness of 0.5 to 10 nanometers.

The noble metal catalyst may further be supported on a portion of the substrate surface.

The amorphous metal oxide layer may be formed via sputtering with a source of $MO_y$ and a source of an inert gas separately provided from the source of $MO_y$, y is of a value same to or different from x.

The amorphous metal oxide layer may be formed via sputtering with a source of neat metal M and a source of a mixed gas separately provided from the source of neat metal M, the mixed gas including oxygen and an inert gas.

The formation of the amorphous metal oxide may be carried out at a temperature below the crystallization temperature of the metal oxide $MO_x$, and/or at an oxygen-to-inert gas ratio of 10 to 30 percent by volume.

DETAILED DESCRIPTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Electrochemical devices such as fuel cells employ certain catalysts to facilitate electrochemical reactions. Platinum is a widely-used catalyst in these devices. In order for catalysts such as platinum to function effectively a suitable substrate is used to support and enhance the catalytic activities of the catalyst.

Inventors of the present invention have discovered that oxides of certain readily available metals can be configured into their amorphous, conductive state, which can be used as a substrate for supporting the catalyst. Certain considerations having been considered in designing the substrate. One such consideration is that the substrate cannot be completely insulating, which may retard the electrochemical reactions. Another consideration is the cost such that the material and manufacturing cost for producing the substrate should not be a limiting factor in formulating the entire electrochemical device. As is detailed herein elsewhere, the amorphous metal oxides are believed to be relatively more resistant to transformation into an insulating state and are relatively more stable to maintaining at a conductive state.

Figure 1A:
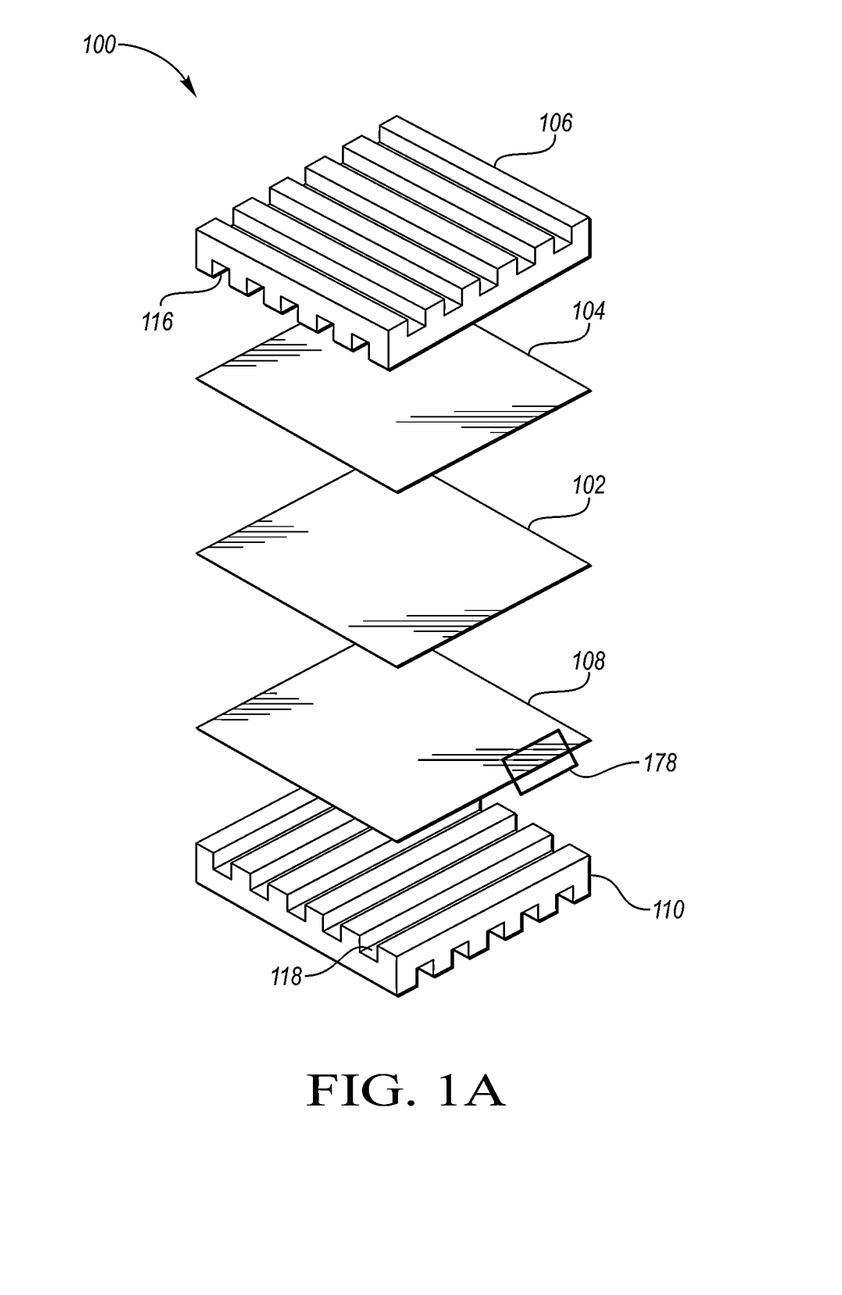
FIG. 1A illustratively depicts a perspective view of a fuel cell according to one or more embodiments of the present invention.

For the purpose of illustration, an exemplary electrochemical device such as a fuel cell 100 is schematically depicted in FIG. 1A. The fuel cell 100 includes a pair of bi-polar plates 106, 110 having grooves 116, 118 formed at a predetermined interval on both sides of each of the bi-polar plates 106, 110. The fuel cell 100 also includes an ionic exchange membrane 102 disposed between the bi-polar plates 106, 110, a first electrode such as an air electrode 108 disposed between the ionic exchange membrane 102, 110 and the bi-polar plate 110, and a second electrode such as a fuel electrode 104 disposed between the ionic exchange membrane 102 and the bi-polar plate 106.

The bi-polar plates 106 and 110 are for electrically connecting the air electrode 108 and the fuel electrode 104, and preventing fuel and air (an oxidizer) from being mixed. The grooves 116 and 118 are used as fuel and air passages in the cells connected end to end.

In operation, air is brought into contact with the air electrode 108, and hydrogen gas is brought into contact with the fuel electrode 104 as fuel, which results in separation of the hydrogen gas into hydrogen ions and electrons on the fuel electrode 104. These hydrogen ions are combined with water to move to the air electrode 108 side through the ionic exchange membrane 102, while the electrons move via an external circuit (not shown) to the air electrode 108 side. In the air electrode 108, oxygen, electrons, and hydrogen ions react to generate water.

Figure 1B:
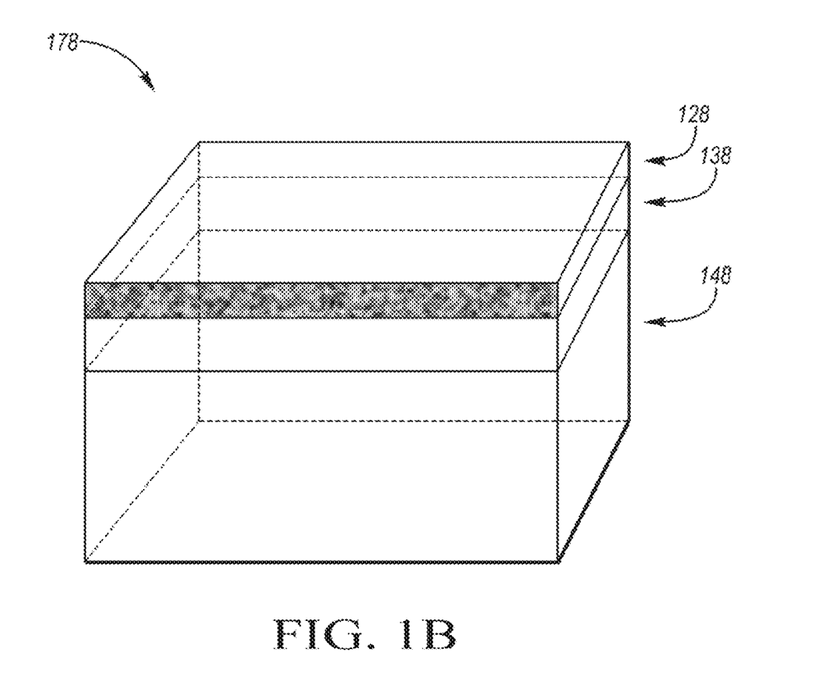
FIG. 1B illustratively depicts a perspective view of a cathode referenced in FIG. 1A.

FIG. 1B illustratively depicts a portion 178 of the electrode 108, the portion 178 including a catalyst 128 supported on a catalyst promoter 138, the catalyst 128 including a noble metal. The catalyst promoter 138 includes an amorphous metal oxide of an amount greater than 50 percent by weight of the total weight of the catalyst promoter 138. In certain instances, the amorphous metal oxide may be of an amount of greater than 60, 70, 80, 90, or 99 percent by weight of the total weight of the catalyst promoter 138. The catalyst promoter 138 may alternatively be termed as an amorphous metal oxide layer.

Figure 1C:
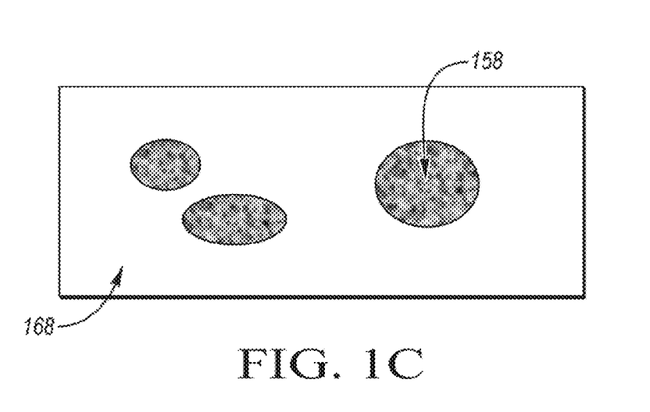
FIG. 1C illustratively depicts a perspective view of a supported substrate referenced in FIG. 1B.

In a variation, and as depicted in FIG. 1B, the catalyst promoter 138 is further supported on a substrate 148. The catalyst promoter 138, the catalyst 128 and the substrate 148 can all be in a layer-to-layer configuration and in full contact with each other, but they do not have to be. For instance, and as depicted in FIG. 1C, the catalyst promoter 138 may be discontinuous and is configured as a number of discontinuities or patches 158, at least a portion of which being spaced apart from each other. In this configuration, the catalyst promoter 138 only covers a portion of an external surface 168 of the substrate 148, with the level of coverage being from 25 to 75%, 30 to 70%, 35 to 65% or 40 to 60%. This configuration may be beneficial in that the discontinuities 158 may form a seeding plate to facilitate a desirable growth the catalyst 128. The desirable growth may be a growth of the catalyst 128 in the crystalline [111], [110] and [001] orientation. Without wanting to be limited to any particular theory, it is believed that some remaining local atomic (short-range) order of the amorphous metal oxides can facilitate the d-band interaction between the catalyst atoms and the substrate such that electrocatalytic activities can be enhanced.

With this configuration, a portion of the catalyst 128 can be in direct contact with the substrate 148. When the amorphous metal oxide covers only a portion of the support layer, the support layer does not need to be conductive, although suitable if it is conductive. This is at least because the catalyst and amorphous metal oxide layer should have provided sufficient electronic conductivity.

Figure 2A:
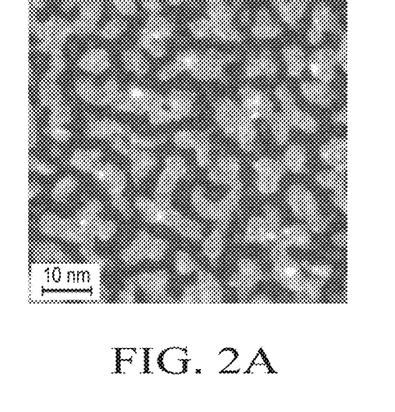
FIG. 2A depicts isolated island like morphology and distribution of $NbO_x$ as deposited via sputtering.
Figure 2B:
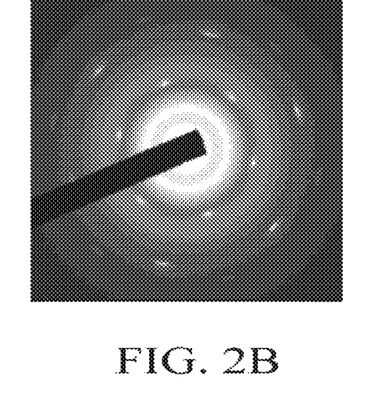
FIG. 2B depicts SAED results of the deposited $NbO_x$ referenced in FIG. 2A.
Figure 2C:
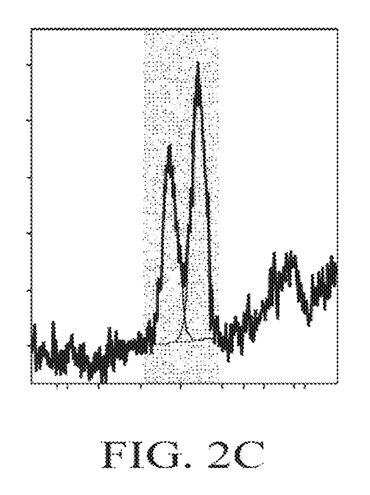
FIG. 2C depicts XPS results of the deposited $NbO_x$ referenced in FIG. 2A.
Figure 2D:
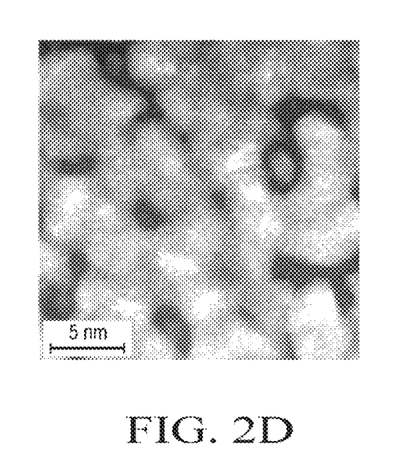
FIG. 2D depicts the morphology of Pt—$NbO_x$ as deposited via sputtering.

Moreover, and as is discussed in the Example in relation to FIG. 2D, the catalyst 128 may form a percolated two dimensional network when coming in contact with the discontinuities 158 via sputtering deposition. Without wanting to be limited to any particular theory, it is believed that the discontinuities 158 of amorphous oxide favorably position the catalyst atoms as deposited, and facilitate the oriented crystalline growth of the deposited catalyst atoms and hence the much enhanced catalytic activity and stability.

The discontinuities 158 may be of any suitable dimensions. The discontinuities 158 may be provided with an average diameter 0.5 to 10 nanometers, 1 to 7 nanometers, or 2 to 3 nanometers. The catalyst promoter 138 and the discontinuities 158 in particular may be provided with an average thickness of less than 50 nanometers, 40 nanometers or 30 nanometers. In certain instances, the average thickness is 0.5 to 10 nanometers, 1 to 7 nanometers, or 2 to 3 nanometers. These thickness values are relatively small and can only be formed through certain methods. As will be detailed herein elsewhere, sputtering is one of such methods. These parameters may not necessarily affect the electronic conductivity of the $MO_x$ as deposited, yet may affect the morphology and interaction with the catalyst to be deposited.

The substrate 148 may be formed of any suitable materials. Non-limiting examples of the materials forming the substrate 148 include glassy carbon. Glassy carbon is amorphous (in comparison to graphitic carbon) synthetic product, and has lower density than graphite. In certain instances, the substrate 148 includes less than 50 percent, 40 percent, 30 percent 20 percent, 10 percent, 5 percent, 1 percent, or 0.1 percent by weight of any metals. This may become important as presence of metals in the substrate 148 does not provide added value to the electrochemical device 100. Rather, the present of metals in the substrate 148 may impart unnecessary weight and sensitivity to corrosion particularly within the context of a fuel cell.

In certain instances, the substrate 148 can be a gas diffusion layer (GDL). In this connection, the amorphous metal oxide may be directly formed onto the GDL via sputtering as will be detailed herein elsewhere.

In certain other instances, supported catalyst can be configured as a number of core-shell particles, wherein the shell includes noble metal catalyst, the core includes the substrate such as glassy carbon, and the amorphous metal oxide layer is disposed between the noble metal catalyst and the substrate.

In one or more embodiments, the term "amorphous metal oxides" refers to those metal oxides having at least one of the following features: being substantially without grain boundaries, with local/short-range order atomic arrangement, and being substantially without long-range order of atomic arrangement characteristic of a crystal, such that these metal oxides are less likely to be transformed into crystalline structure. Amorphous conductive metal oxides are resistant to oxygen incorporation, thus preserving the structural stability and electronic conductivity of as-made materials.

Another benefit of the amorphous structure is that the metal oxides, when in amorphous state, may be configured into thin films with relatively greater ease than their crystalline counterpart.

In contrast, acrystal or crystalline solid is a solid material whose constituent atoms, molecules, or ions are arranged in an ordered pattern extending in all three spatial dimensions. In addition to their microscopic structure, large crystals are usually identifiable by their macroscopic geometrical shape, consisting of flat faces with specific, characteristic orientations. The scientific study of crystals and crystal formation is known as cyrstallography. The process of crystal formation via mechanisms of crystal growth is called crystallization or solidification. Common crystals include snowflakes, diamonds, and table salt; however, most common inorganic solids are polycrystals.

The amorphous metal oxide may be of a general formula of $MO_x$, with x being sub-stoichiometric relative to oxygen such that $MO_x$ is oxygen deficient. With $MO_x$ being sub-stoichiometric relative to the oxygen atom, the structures of the amorphous metal oxides $MO_x$ contain oxygen vacancies, wherein some of the lattice sites which would have been occupied by oxygen atoms are vacant. This would contribute to higher metallic conductivity of a particular sub-stoichiometric $MO_x$ due to the relatively higher fraction of M-M bonds verse $MO_x$ in the sub-stoichiometric oxide versus the stoichiometric oxide.

Non-limiting examples of the metal M in the amorphous conductive $MO_x$ include Sc, Ti, Cr, Y, Zr, Nb, Mo, Ru, Rh, Pd, Hf, Ta, W, Re, Ir, Pt, Au or alloys and combinations thereof.

As detailed herein else, x is sub-stoichiometric relative to the oxygen atom. By way of example, and in the instance of Nb, crystalline NbO and $NbO_2$ are electronically conducting. In contrast, crystalline $Nb_2O_5$ is electronically insulating. However, a range of Niobium oxides sputtered from Nb, NbO, $NbO_2$ or $Nb_2O_5$ can be amorphous and electronically into conductive. A stable, conductive amorphous metal oxide might be able to maintain the beneficial effects of a metal oxide support on Pt activity without loss of support conductivity and stability due to support oxidation. Therefore, in the instance of amorphous $NbO_x$, the presence of crystalline $Nb_2O_5$ should be avoided, and when incidentally included, $Nb_2O_5$ should be in an amount of no more than 5%, 2.5%, 1% or 0.5% of the total weight of the catalyst promoter 138.

The catalyst promoter 138 includes less than 20 percent, 10 percent, 5 percent, 1 percent, 0.1 percent, or 0.01 percent by weight of any impurities. The impurities may include anything other than the targeted amorphous metal oxide. In certain instances, the impurities may be in the form of an incidental presence of crystalline metal oxides. In certain particular instance, a weight ratio of incidentally present crystalline metal oxide relative to the targeted amorphous metal oxide is less than 0.05, 0.01 or 0.001 such that the catalyst promoter 138 can be considered as substantially free from any incidentally present crystalline metal oxide. Therefore, in the instance of amorphous $NbO_x$, the presence of crystalline $Nb_2O_5$ should be avoided, and when incidentally included, $Nb_2O_5$ should be in an amount of no more than 20, 10, 5, 1, 0.1 or 0.01 weight percent of the total weight of the catalyst promoter 138.

In certain other instances, the impurities may be in the form of an incidental presence of any noble metals and/or salts and alloys thereof, such as platinum, ruthenium, rhodium, palladium, silver, gold, iridium, and osmium. The catalyst promoter 138 does not necessarily include any noble metals from the perspectives of cost effectiveness. To the extent that the catalyst promoter 138 and the catalyst 128 are in contact, no chemical bond such as metallic bond formation is intended between the metal M in the catalyst promoter 138 and the noble metal in the catalyst 128.

Without wanting to be limited to any particular theory, it is believed that relatively low impurity rate detailed herein above is effectuated via the use of sputtering technologies operated at certain suitable parameters. The sputtering can be operated with a clean source for M, a clean source for O, and with the assistance of a vacuum. As a result, the amorphous metal oxide as formed from the sputtering can be of a relatively high purity. This benefit is in direct comparison to some other methods where metal oxides are formed via a wet liquid application coated as a layer which inevitably includes uncontrollable amount of impurities, let alone controllable presence of amorphous metal oxide and controllable absence of crystalline metal oxide.

The catalyst promoter 138 can be prepared by physical vapor deposition (PVD) such as sputtering, sol-gel processing, chemical vapor deposition (CVD), and atomic layer deposition (ALD). ALD in general may make use of various oxygen sources for the decomposition of precursor compounds. Both water and oxygen may be used in ALD processes.

Sputtering is a process whereby atoms are ejected from a solid source material via bombardment exerted by energetic particles. It happens when the kinetic energy of the incoming particles is much higher than conventional thermal energies. Physical sputtering may be driven by momentum exchange between the ions and atoms in the materials, due to collisions. The primary particles for the sputtering process can be supplied in a number of ways, for example by a plasma, an ion source, an accelerator or by a radioactive material emitting alpha particles.

Preferential sputtering can occur at the start when a multi-component solid source material is bombarded and there is no solid state diffusion. If the energy transfer is more efficient to one of the source components, and/or it is less strongly bound to the solid, it will sputter more efficiently than the other. If in an AB alloy the component A is sputtered preferentially, the surface of the solid will, during prolonged bombardment, become enriched in the B component thereby increasing the probability that B is sputtered such that the composition of the sputtered material will be AB. This is useful to form the $MO_x$ when M of the $MO_x$ includes two or more elements.

To ensure the metal oxides contained within the catalyst promoter 138 are amorphous, certain operation parameters should be controlled. For instance, the sputtering should be conducted at a temperature no greater than the crystallization temperature of the metal oxide $MO_x$ to avoid any formation of the crystalline structures of the metal oxides. Taking $NbO_x$ for an example, the sputtering should be carried out at below 700° C. at all times.

With the sputtering, the amorphous metal oxides may form into spaced apart patches, such as the ones detailed in FIG. 1C. The morphologies of these patches may be evaluated via transmission electron microscopy (TEM).

Transmission electron microscopy (TEM) is a microscopy technique whereby a beam of electrons is transmitted through an ultra thin specimen, interacting with the specimen as it passes through. An image may be formed from the interaction of the electrons transmitted through the specimen. TEMs are capable of imaging at a significantly higher resolution than light microscopes. This enables the instrument's user to examine fine detail—even as small as a single column of atoms, which is tens of thousands times smaller than the smallest resolvable object in a light microscope.

To obtain the metal oxide as deposited being amorphous and conductive, certain operation parameters should be considered. These parameters may include type of the starting materials, the oxygen to argon ratios and deposition temperatures. By way of example, the deposition temperature and/or the material temperature are to be maintained below the re-crystallization temperature at all times and under all operational conditions. If the material temperature exceeds the re-crystallization temperature, the amorphous material crystallizes, and the favorable amorphous properties are lost. Moreover, it is believed that if a metal oxide stays amorphous throughout an entire temperature window needed for the fuel cell operation, the metal oxide will stay conductive throughout.

Another consideration is the oxygen content in the gas mixture for forming the plasma in the sputtering process. The gas mixture may include an inert gas in addition to oxygen. Argon gas is a non-limiting example of the inert gas. When oxygen and argon are used, oxygen to argon volume ratio should be kept at 10 to 30%. This ratio is beneficial in that the amount of oxygen is controlled such that the metal oxides as formed via the sputtering may be oxygen deficient. As mentioned herein elsewhere, the amorphous metal oxide with oxygen being deficient is electrically more conductive than a counterpart that is not oxygen deficient.

Without wanting to be limited to any particular theory, it is believed that when the substrate temperature is appropriate, that is above 300° C. but below the crystallization temperature of about 700° C., the Pt deposited on the amorphous conductive metal oxide forms a 2-D percolated Pt network. The obtained Pt based ORR catalyst on conductive amorphous metal oxide substrate exhibits bulk-like ORR activity.

Yet another consideration for carrying out the sputtering is the vacuum level. The vacuum level may be used to control the cleanliness of the $MO_x$ layer as deposited and hence the nucleation of the individual deposition layers.

The substrate may be formed via sputtering with a source of $MO_y$, and a source of an inert gas separately provided from the source of $MO_y$, wherein y may the same as or different from x. By way of example, and when M is Nb, $MO_y$ may be $Nb_2O_5$ with y being 2.5 and $MO_x$ may be NbO or $NbO_2$ or any other compositions with x being of a value between 0.9 and 2.2.

Alternatively, the sputtering may be carried out with a source of neat metal M and a source of a mixed gas separately provided from the source of neat metal M, the mixed gas including oxygen and an inert gas. The inert gas and oxygen are used to form a plasma for the sputtering process. M is sputtered with the plasma to form a desirable amorphous metal oxide on a receiving surface. In forming the substrate, the sputtering may be carried out at an oxygen to inert gas ratio of 10 to 30 percent by volume.

The amorphous metal oxides may be detected and analyzed using TEM or high resolution transmission electron microscopy (HRTEM) coupled with selected angle electron diffraction (SAED). SAED may be performed with a TEM in diffraction mode.

Selected area (electron) diffraction (SAED) is a crystallographic experimental technique that can be performed inside a TEM. In a TEM, a thin crystalline specimen is subjected to a parallel beam of high-energy electrons. Because the wavelength of high-energy electrons is a few thousandths of a nanometer, and the spacing between atoms in a solid is about a hundred times larger, the atoms act as a diffraction grating to the electrons, which are diffracted. That is, some fraction of them will be scattered to particular angles, determined by the crystal structure of the sample, while others continue to pass through the sample without deflection. As a result, the image on the screen of the TEM will be a series of spots—the selected area diffraction pattern, each spot corresponding to a satisfied diffraction condition of the sample's crystal structure.

SAD is referred to as "selected" because the user can easily choose from which part of the specimen to obtain the diffraction pattern. This is important, for example, in polycrystalline specimens. If more than one crystal contributes to the SADP, it can be difficult or impossible to analyze. As such, it is useful to select a single crystal for analysis at a time. It may also be useful to select two crystals at a time, in order to examine the crystallographic orientation between them.

As a diffraction technique, SAD can be used to identify crystal structures and examine crystal defects. It is similar to XRD, but unique in that areas as small as several hundred nanometers in size can be examined, whereas XRD typically samples areas several centimeters in size.

Having generally described several embodiments of this invention, a further understanding can be obtained by reference to certain specific examples which are provided herein for purposes of illustration only and are not intended to be limiting unless otherwise specified.

EXAMPLE

Amorphous $NbO_x$ conductive metal oxide is formed via magnetron sputtering from either $Nb_2O_5$ in Ar (argon) or Nb in a gas mixture of 10-30 volume percent of $O_2$ with 70 to 90 volume percent of Ar onto a 5 mm diameter glassy carbon rod. Argon gas is used to generate the plasma for the sputtering process. The oxygen and argon gas mixture stays at room temperature.

Figure 4:
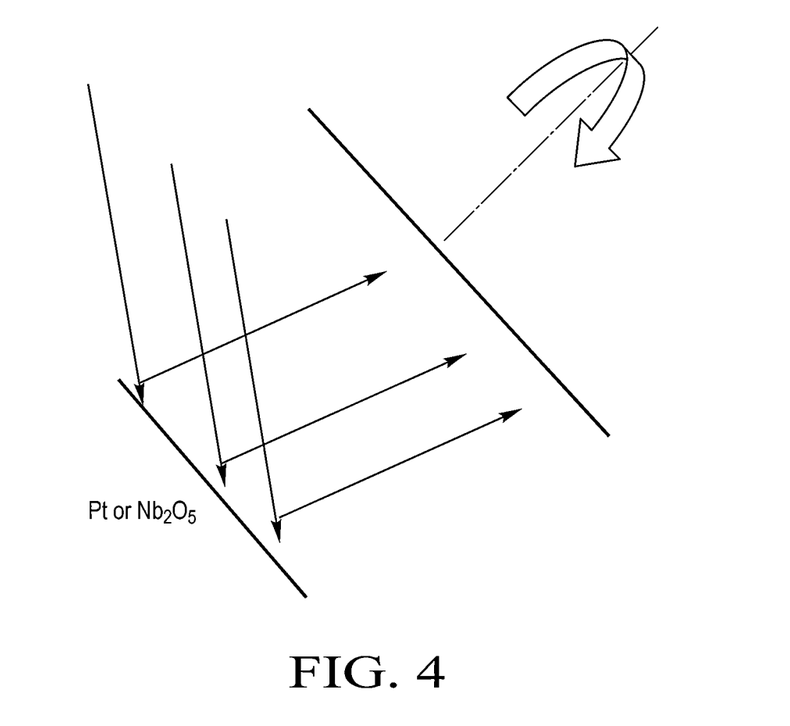
FIG. 4 illustratively depicts an example sputtering process referenced in the Example.

The sputtering is illustratively shown in FIG. 4. As illustratively depicted in FIG. 4, the plasma formed from Ar and/or O2 knocks out the Nb source target; the resultant Nb target is then released and flies towards and stick onto the base of glassy carbon.

To obtain the metal oxide as deposited being amorphous, the deposition temperature and/or the material temperature are maintained below the recrystallization temperature at all times and under all operational conditions. For $NbO_x$, this temperature is roughly 700° C. If the material temperature exceeds the recrystallization temperature, the amorphous material crystallizes, and the favorable amorphous properties are lost.

After the amorphous $NbO_x$ is formed on the base of glassy carbon, a 2.4 nm Pt is deposited onto the formed $NbO_x$ and/or the base of glassy carbon.

FIG. 2A shows transmission electron microscopy (TEM) image results of the obtained $NbO_x$ formed on the base of glassy carbon, in which the $NbO_x$ as sputtered appears to have the morphology of spaced part amorphous islands.

FIG. 2B shows SAED image results of the amorphous $NbO_x$ islands depicted in FIG. 2A. The SAED image results show rings of clouds which are consistent with the $NbO_x$ being amorphous in comparison to crystalline.

FIG. 2C shows electronic photoemission image results of the amorphous $NbO_x$ islands referenced in FIG. 2A. The electronic photoemission image results demonstrate that the value of x is between 1 and 2.

FIG. 2D shows transmission electron microscopy (TEM) image results of the sample construction with Pt sputtered onto the $NbO_x$ as supported on the glassy carbon. The TEM image results show that the Pt as deposited is of a somewhat percolated network configuration. It appears that the amorphous $NbO_x$ islands help bring the Pt growth portions closer and cover some of the otherwise areas of exposed glassy carbon.

Figure 3A:
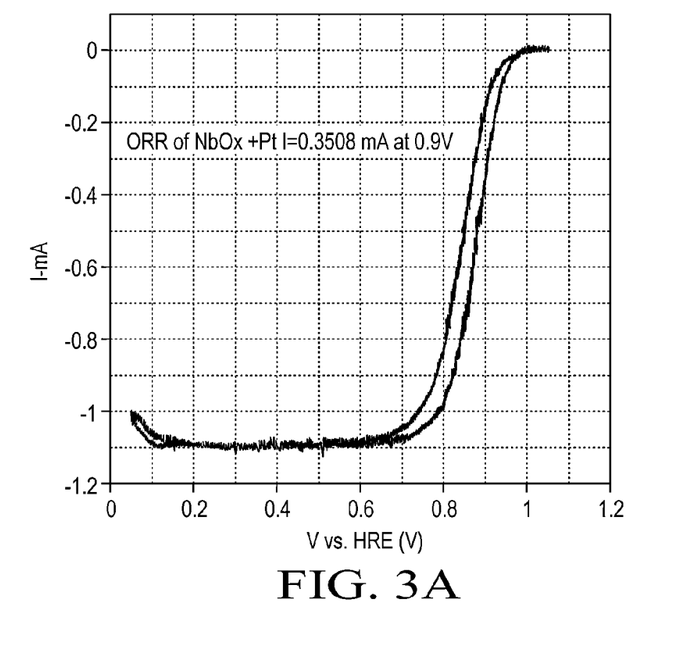
FIG. 3A depicts ORR results obtained at 1600 rpm in 0.1 M $HClO_3$ (b) on Pt—$NbO_x$ referenced in FIG. 2D.

FIG. 3A shows the ORR activity of the sample construction referenced in FIG. 2D, measured through rotation disc electrode method and expressed as current as a function of applied voltage measured against a hydrogen reference electrode (HRE).

Figure 3B:
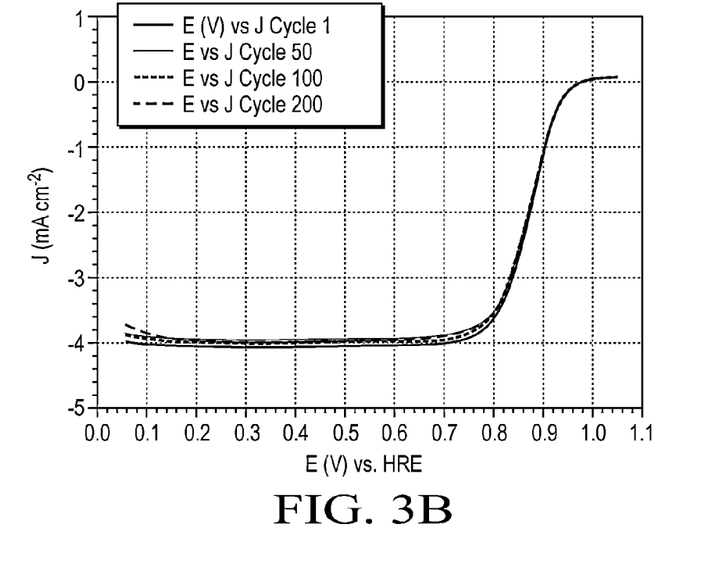
FIG. 3B depicts electrochemical stability of ORR at 1600 rpm in 0.1M $HClO_3$ (c) on Pt—$NbO_x$ referenced in FIG. 2D.

FIG. 3B shows the ORR activity of the same sample construction referenced in FIG. 3A, yet after 200 ORR cycles. It appears from FIG. 3B, that the same construction of Pt on amorphous $NbO_x$ and/or glassy carbon is electrochemically stable even after 200 ORR cycles.

Table 1 tabulates kinetic current data from duplicate runs. As reported in Table 1, kinetic current of the obtained structure with 2.4 nm Pt on $NbO_x$ supported on glass carbon is about 1900 $\mu A/cm^2$, mimicking the ORR activity of bulk Pt.

TABLE 1

| 2.4 nm Pt on amorphous NbO$_x$ supported on glassy carbon | Roughness | Jk (μA/cm$^2$) |
|---|---|---|
| Run 1 | 1.5 | 1825 |
| Run 2 | 1.2 | 2138 |
| Average | 1.3 | 1982 |

The results above suggest that when the substrate temperature is appropriate, that is above 300° C. but below the crystallization temperature of about 700° C., the Pt deposited on the amorphous conductive metal oxide forms a percolated Pt network. The obtained Pt based ORR catalyst on conductive amorphous metal oxide substrate exhibits bulk-like ORR activity.

U.S. patent application Ser. No. 13/721,883, filed on Dec. 20, 2012 may be related to the method disclosed and claimed herein, and is incorporated herein by reference in its entirety.

While the best mode for carrying out the invention has been described in detail, those familiar with the art to which this invention relates will recognize various alternative designs and embodiments for practicing the invention as defined by the following claims.

What is claimed is:

1. A method comprising:
   forming an amorphous metal oxide (MO$_x$) layer on a substrate having a substrate surface, via sputtering with a source of MO$_y$ and a source of an inert gas separately provided from the source of MO$_y$, y is of a value same as or different from x; and
   depositing a Pt catalyst to form a two dimensional percolated network supported on the amorphous metal oxide layer.

2. The method of claim 1, wherein the amorphous metal oxide layer contacts only 25 to 75 percent of the substrate surface.

3. The method of claim 1, wherein the amorphous metal oxide layer includes less than 10 weight percent of crystalline metal oxide.

4. The method of claim 1, wherein the amorphous metal oxide layer is substantially free of crystalline metal oxide.

5. The method of claim 1, wherein the x of MO$_x$ is sub-stoichiometric relative to O.

6. The method of claim 1, wherein the x of MO$_x$ is between 0.9 and 2.2.

7. The method of claim 1, wherein the amorphous metal oxide layer includes a number of discontinuities.

8. A method comprising:
   forming an amorphous metal oxide (MO$_x$) layer on a substrate having a substrate surface at a temperature below a crystallization temperature of the MO$_x$; and
   depositing a Pt catalyst to form a two dimensional percolated network supported on the amorphous metal oxide layer.

9. The method of claim 8, wherein the amorphous metal oxide layer contacts only 25 to 75 percent of the substrate surface.

10. The method of claim 8, wherein the amorphous metal oxide layer includes less than 10 weight percent of crystalline metal oxide.

11. The method of claim 8, wherein the amorphous metal oxide layer is substantially free of crystalline metal oxide.

12. The method of claim 8, wherein the x of MO$_x$ is sub-stoichiometric relative to O.

13. The method of claim 8, wherein the x of MO$_x$ is between 0.9 and 2.2.

14. The method of claim 8, wherein the amorphous metal oxide layer includes a number of discontinuities.

15. A method comprising:
   forming an amorphous metal oxide (MO$_x$) layer on a substrate having a substrate surface via sputtering at an oxygen-to-inert gas ratio of 10 to 30 percent by volume; and
   depositing a Pt catalyst to form a two dimensional percolated network supported on the amorphous metal oxide layer.

16. The method of claim 15, wherein the amorphous metal oxide layer contacts only 25 to 75 percent of the substrate surface.

17. The method of claim 15, wherein the amorphous metal oxide layer includes less than 10 weight percent of crystalline metal oxide.

18. The method of claim 15, wherein the amorphous metal oxide layer is substantially free of crystalline metal oxide.

19. The method of claim 15, wherein the x of MO$_x$ is sub-stoichiometric relative to O.

20. The method of claim 15, wherein the x of MO$_x$ is between 0.9 and 2.2.

* * * * *